Aug. 17, 1926.  
C. L. JOHNSON  
1,596,271  
GEAR SHIFT LEVER LOCK  
Filed Jan. 31, 1923  
2 Sheets-Sheet 1
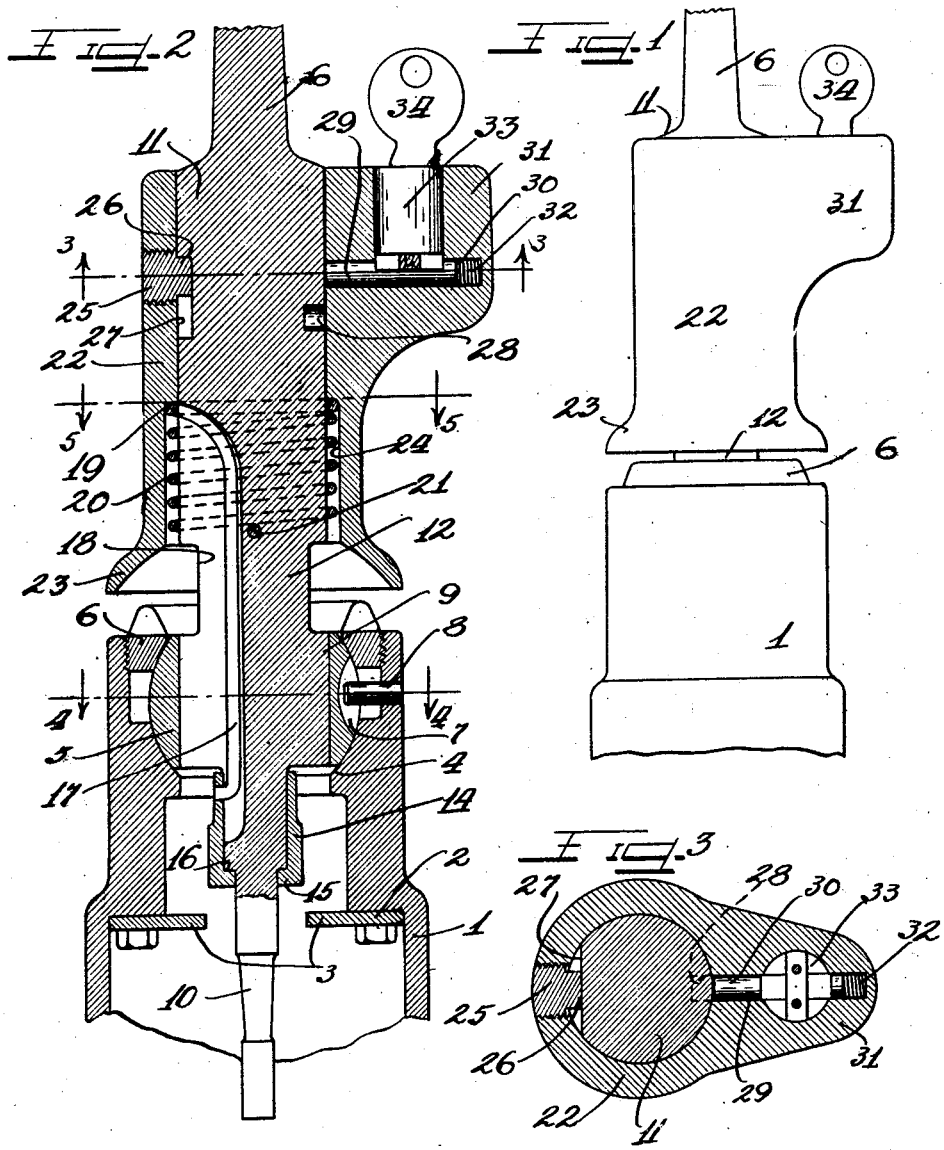
Witnesses  
Inventor  
COLVIN L. JOHNSON  
by  
Atty

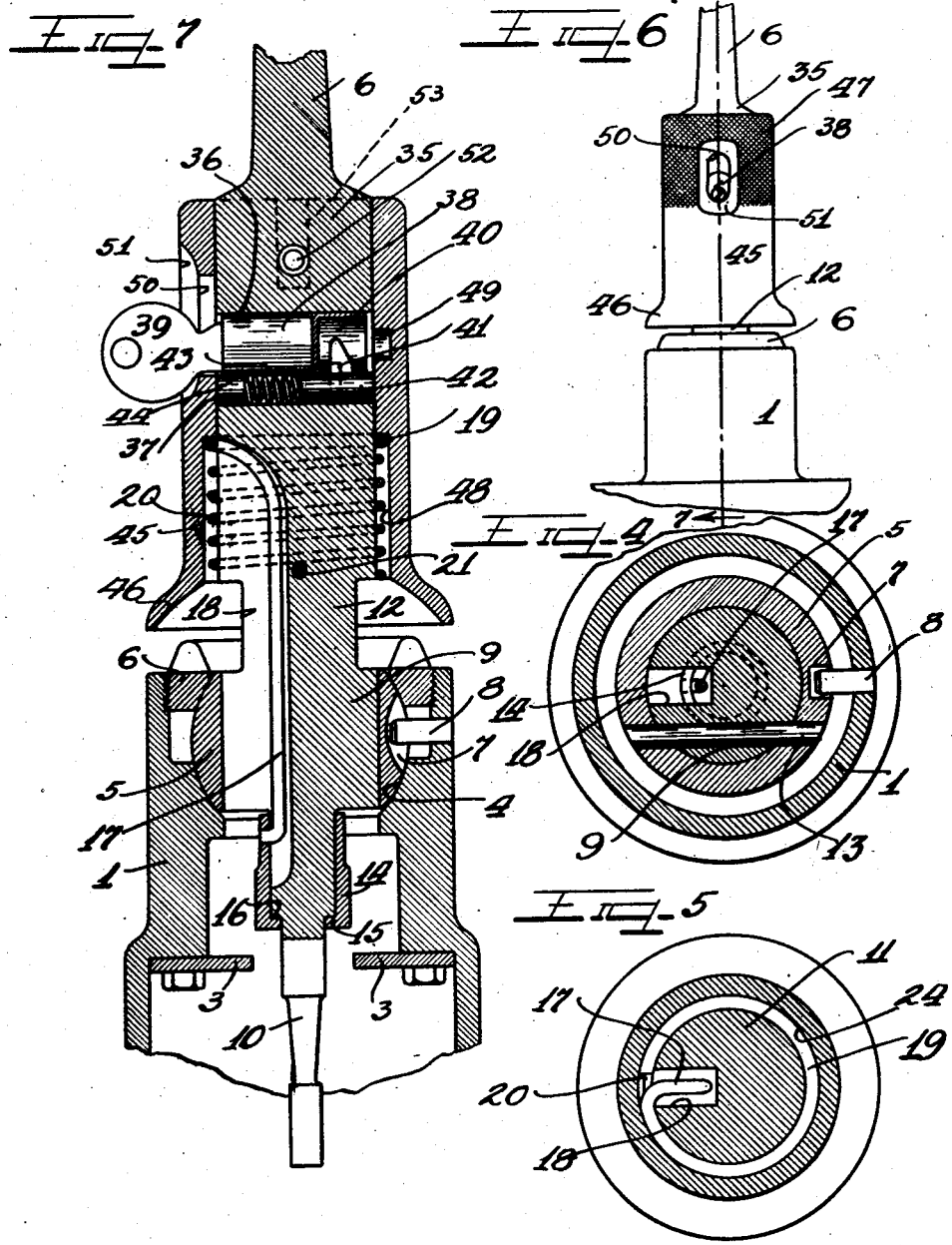

Patented Aug. 17, 1926.

1,596,271

UNITED STATES PATENT OFFICE.

COLVIN L. JOHNSON, OF ST. LOUIS, MISSOURI, ASSIGNOR TO JOHNSON AUTOMOBILE LOCK CO., OF ST. LOUIS, MISSOURI, A CORPORATION OF ILLINOIS.

GEAR-SHIFT-LEVER LOCK.

Application filed January 31, 1923. Serial No. 616,024.

This invention relates to an improved gear shift lever lock having a shiftable steel housing adapted to protect not only the pin lock cylinder but all of the gear shift lever operating mechanisms positioned above the floor board on which the gear shift lever is supported, said housing adapted to be manually shifted on the gear shift lever into a locked position to move a spring controlled locking collar on the lower end of the gear shift lever into a locking position between two stationary plates to hold the gear shift lever locked against movement in a neutral position.

It is an object of this invention to provide a gear shift lever with a locking member adapted to be moved into locking position by means of a protecting housing which is adapted to be automatically locked in its lowermost position and is adapted to be released by means of a key to permit a compressed control spring to act automatically to simultaneously return the protecting housing and the locking member back into raised normal unlocked position to permit operation of the gear shift lever.

It is also an object of the invention to provide a gear shift lever with a protecting housing and with a locking member actuable thereby, said housing and member adapted when manually moved into locking position to be released only by means of a key.

Another object of the invention is to provide a gear shift lever locking mechanism having a protecting housing which when pushed into a lower locked position on the gear shift lever compresses a spring and moves a locking member on the lower end of the gear shift lever into position between stationary plates to hold the gear shift lever locked against movement.

It is a further object of the invention to provide a gear shift lever locking mechanism with a steel housing carrying a pin controlled latch pin adapted to automatically engage in a recess in the gear shift lever when the housing is manually pushed downwardly on said lever to move a locking member into position to hold the gear shift lever locked against operation.

It is an important object of this invention to provide a gear shift lever lock of improved and simplified construction having a locking member for the gear shift lever adapted to be moved into locking position by the movement of a steel protecting housing mounted on the gear shift lever to protect the various parts connected with the locking member and positioned above the floor board.

Other and further important objects of this invention will be apparent from the disclosures in the specification and the accompanying drawings.

The invention (in a preferred form) is illustrated on the drawings and hereinafter more fully described.

On the drawings:

Figure 1 is a fragmentary side elevation of a gear shift lever and locking mechanism embodying the principles of this invention.

Figure 2 is an enlarged longitudinal section thereof showing parts in elevation.

Figure 3 is a transverse section taken on line 3—3 of Figure 2.

Figure 4 is a transverse section taken on line 4—4 of Figure 2.

Figure 5 is a transverse section taken on line 5—5 of Figure 2.

Figure 6 is a fragmentary side elevation of a modified form of a gear shift lever lock.

Figure 7 is an enlarged longitudinal section taken on line 7—7 of Figure 6 with parts in elevation.

As shown on the drawings:

The reference numeral 1 indicates an upright fulcrum housing or gear shift lever supporting pedestal mounted or formed on supporting pedestal mounted or formed on the cover plate of a vehicle gear shift casing (not shown). The lower portion of the pedestal 1 is slightly enlarged and is provided with shoulders 2 to which spaced guide plates 3 are bolted. The upper portion of the pedestal 1 is provided with a rounded recess or socket 4 for receiving the pivot ball 5 of a gear shift lever 6. A threaded ring 7ª is threaded into the upper internally threaded end of the pedestal 1 to hold the pivot ball 5 seated in position. The pivot ball 5 is provided with a recess or slot 7 into which the inner end of a pin 8 projects to hold the pivot ball against rotation in the socket 4. The pin 8 is supported radially in the pedestal 1 (Figure 2).

The pivot ball member 5 is in the form of a sleeve and is rigidly secured by means of a rivet or pin 13 upon an annular flange 9 integrally formed on the lower portion of the gear shift lever 6 between a tail piece 10 and an enlarged cylindrical body portion 11.

The flange portion 9 and the enlarged portion 11 of the gear shift lever are connected by a neck portion 12 of reduced diameter. Slidably engaged on the gear shift lever tail piece 10 is a locking block 14, the lower end of which is provided with an inwardly directed flange 15 adapted to engage against a shoulder 16 on the tail piece 10 to limit the upward movement of the locking block. Attached to the locking block 14 is the lower end of a heavy wire or rod 17 which is disposed to slide within a longitudinal groove or recess 18 extending from the tail piece 10 upwardly through the flange 9 and the neck portion 12 into the lower portion of the cylindrical body portion 11 (Figure 2). The upper end of the heavy wire 17 projects from the groove 18 and is curved around the cylindrical body portion 11 of the gear shift lever, in the form a ring 19. To hold the locking block 14 in a raised retracted position against the tail piece shoulder 16 a heavy coiled spring 20 is engaged around the lower part of the cylindrical body portion 11 of the gear shift lever. The upper round of the spring 20 seats against the ring 19 while the lower round of said spring 20 seats against stop pins 21 projecting radially from the lower end of the body portion 11.

Shiftable upon the lever body portion 11 is a steel housing 22, the lower end of which flares outwardly and downwardly to form a dust cap 23. The lower portion of the inner wall of the housing 22 is provided with an annular recess 24 within which the ring 19 and the spring 20 are disposed. The housing 22 is provided with a threaded aperture into which the threaded screw head 25 of stud or pin 26 is threaded. The inner end of the stud 26 projects into a recess 27 provided in the lever body portion 11 (Figure 2). The movement of the housing on the lever body portion is limited by the stud 26 engaging the ends of the recess 27. The lever body portion 11 is also provided with a radial notch or recess 28 adapted to receive the inner end of a latch bolt 29 when the housing is shifted into its lower locking position. The latch bolt 29 is slidably disposed within a passage or recess 30 provided in a boss or projection 31 integrally formed at one side of the upper end of the housing 22. A coiled spring 32 is seated within the recess 30 behind the latch bolt 29 to project the latch bolt into the recess 28 in the gear shift lever when the housing 22 is pushed downwardly on the gear shift lever to bring the housing recess 30 into register with the recess 28. The latch bolt 29 is connected with the barrel of a pin lock 33 to permit retraction of the latch bolt when a key 34 is inserted into the pin lock and turned to rotate the lock barrel.

Figures 6 and 7 illustrate a modified form of gear shift lever lock wherein a number of the parts are the same as those illustrated in Figure 2 and are designated by similar reference numerals. In this form of the device, the gear shift lever 6 is provided with an integral enlarged body portion 35 around which the ring 19 and the spring 20 are engaged. The body portion 35 is provided with two parallel diametric passages 36 and 37 disposed one above the other and communicating along their adjacent sides. The upper passage 36 is larger in diameter than the lower passage 37 and has mounted therein a pin lock 38 operable by means of a removable key 39. Secured to the end of the barrel of the pin lock 38 is a sleeve or drum 40 having a cam slot therein into which a pin 41 projects. The pin 41 is secured diametrically in a latch bolt 42 slidably disposed within the lower passage 37 against one end of a coiled spring 43. A plug 44 is secured in the opposite end of the passage 37.

Slidably engaged on the gear shift lever body portion 35 is a steel housing 45, the lower end of which is flared outwardly and downwardly to form a dust cap 46. The housing 45 is knurled as at 47 to facilitate shifting of the housing 45. The inner wall of the housing 45 is provided with a peripheral recess 48 in which the ring 19 and the spring 20 are adapted to engage. Also provided in the inner wall of the housing 45 is a latch bolt receiving notch or recess 49 normally disposed opposite one end of the body portion upper passage 36 when the housing is held in its elevated position by the spring 20, as illustrated in Figure 7. The housing 45 is provided with a longitudinal opening or slot 50 countersunk or enlarged as at 51 to permit rotation of the key 39. A spring impelled guide pin 52 is secured radially in the body portion 35 and projects into a guide slot 53 provided longitudinally in the inner surface of the upper portion of the housing 45.

The operation is as follows:

With the gear shift lever 6 in neutral position, as illustrated in Figure 2, the control spring 20 acts to hold the housing 22 in its elevated or retracted position to permit a composite movement of the gear shift lever for the purpose of shifting gears by means of the tail piece 10 on said lever. The spring 20 also acts on the ring 19 and acts to hold the locking block 14 elevated in its release position against the shoulders 15 of the tail piece 10. The housing 22 is limited in its movement by the stud 26 acting in the groove 27.

To lock the gear shift lever against operation in a neutral position it is only necessary to manually push the housing 22 downwardly from the position shown in Figure 2 against the action of the control spring 20. Downward movement of the housing forces the ring 19 downwardly thereby causing the wire stem 17 to push the locking block 14 downwardly into locking position between the stationary plates 3. With the downward shifting of the housing 22 the dust cap 23 closes down over the upper end of the pedestal 1 enclosing the lever mechanisms. As the housing 22 is moved downwardly the latch bolt 29 is brought into register with the lever notch 28 and the spring 32 acts automatically to push the latch bolt 29 into said notch 28 to hold the housing locked in its lower locking position.

It will be noted that by simply sliding the housing 22 downwardly on the lever body portion 11, that gear shift lever 6 is simultaneously locked by the locking block 14 as the latch bolt 29 automatically locks said housing in its lowermost locking position against retraction by the control springs 20. The various gear shift lever locking mechanisms are thus enclosed and protected against molestation by unauthorized persons. If the screw stud 25—26 is removed from the housing 22 when the housing is in its lowered position, the housing cannot be removed upwardly off of the gear shift lever since the housing is locked by the latch bolt 29.

To unlock the gear shift lever 6 it is necessary to insert the key 34 into the pin lock 33 and then turn the key to cause retraction of the latch bolt 29. When this is done the spring 20 acts automatically to simultaneously raise the locking block 14 and the housing 22 into normal release positions to permit operation of the gear shift lever. When the housing 20 is in its elevated or release position, as illustrated in Figure 2, the screw stud 25—26 may be removed to permit the housing to be pulled upwardly off of the lever body portion 11 and then off of the lever, if so desired.

The operation of the modified form of the device illustrated in Figures 6 and 7 is similar to that already described. In this case the lever is also locked by pushing the housing 45 downwardly, thereby causing the wire stem 17 to push the locking block 14 between the plates 3. The block 14 and the housing 45 are held in their lower locking positions by the latch bolt 42 which is automatically pushed into the housing notch 49 when the housing is lowered to bring the notch into register with the latch bolt. To unlock the gear shift lever a key 39 is inserted into the lock 38 and rotated to retract the latch bolt 42 to permit the spring 20 to raise the housing 45 and at the same time raise the locking block from between the stationary plates 3.

When the housing is in its elevated normal position it is locked against removal upwardly off of the gear shift lever by the spring impelled pin 52 which projects into the longitudinal slot 53 of the housing and thereby limits the upward movement of said housing. When the gear shift lever is locked by the locking block 14 the housing cannot be pushed upwardly on the lever since the main latch bolt 42 is engaged in the housing notch 49.

I am aware that numerous details of construction may be varied through a wide range without departing from the principles of this invention, and I therefore do not purpose limiting the patent granted otherwise than necessitated by the prior art.

I claim as my invention:

1. The combination with a gear shift lever, of a spring supported thereon, a housing shiftable on said lever and supported by said spring, a locking member slidable on said lever, a stem connected therewith, and a ring formed on said stem and supported on said spring.

2. The combination with a support, of a gear shift lever pivotally supported thereon, spaced plates mounted in said support, a locking member slidably mounted on said lever, a spring supported on said lever, a ring member supported on said spring and connected with said locking member, a protecting housing on said lever supported on said spring and adapted to be shifted on said lever to cause the ring member to push the locking member into locking position between said plates to hold the lever locked against operation, and a key releasable latch bolt mechanism for automatically locking said housing in its lowered locking position.

3. The combination with a gear shift lever having a slot therein, a locking member shiftable on said lever, a stem connected to said locking member and disposed in said slot, a ring formed on the upper end of said stem, a shiftable protecting housing on said lever resting on said ring, and a spring coiled around said lever and supported thereon adapted to hold said locking member and said housing in their elevated release positions.

In testimony whereof I have hereunto subscribed my name.

COLVIN L. JOHNSON.